United States Patent [19]
Padilla

[11] Patent Number: 4,721,128
[45] Date of Patent: Jan. 26, 1988

[54] SAFETY SHUTOFF VALVE—ELECTROMECHANICAL

[76] Inventor: Amando C. Padilla, Apartado Postal 187, Hermosillo, Sonora, Mexico

[21] Appl. No.: 909,169

[22] Filed: Sep. 15, 1986

[51] Int. Cl.$^4$ .............................................. F16K 17/164
[52] U.S. Cl. .............................. 137/456; 137/487.5
[58] Field of Search ................ 137/487.5, 458, 456

[56] References Cited

U.S. PATENT DOCUMENTS 2,442,145  5/1948  Ray .......................... 137/487.5 X

*Primary Examiner*—Alan Cohan
*Attorney, Agent, or Firm*—Paul H. Gallagher

[57] ABSTRACT

A pressure chamber through which the fuel in the fuel line passes, having a diaphragm moving to advanced position by the pressure in the chamber. A PE cell is arranged with light rays passing through the chamber and when the diaphragm is retracted it breaks the light rays and shuts off the circuit but when it is advanced the light rays are not broken and the circuit is energized. A valve in the fuel line has a closer which is moved to closed position when the circuit is de-energized and it remains closed until opened manually for resetting the circuit.

11 Claims, 5 Drawing Figures

SAFETY SHUTOFF VALVE—ELECTROMECHANICAL

FIELD OF THE INVENTION

The invention resides in the field of safety measures in fuel lines, and particularly gaseous fuel lines, where it is desired to completely and quickly shut off the fuel line in the event of interruption of the flow of the fuel.

OBJECTS OF THE INVENTION

A main object of the invention is to provide a novel shutoff means for a fuel line, having the following features and advantages:

1. It is extremely sensitive to the condition of the flow of fuel, and operable for shuting off the line in response to the flow falling only slightly below the desired rate.
2. It is very fast acting.
3. It can be easily adjusted for varying the desired rate of flow of the fuel.

DESCRIPTION OF A PREFERRED EMBODIMENT

Referring to the invention in general, the apparatus is adapted for shutting off a fuel line in the event that the flow of fuel therein drops below a predetermined rate. The apparatus is adapted particularly to gaseous fuel, such as natural gas, and the rate of flow is determined by the pressure thereof. In the operation of the apparatus, the pressure of the fuel is utilized for actuating certain elements, or retaining them in predetermined position, and when that pressure drops below a certain value, the elements of the apparatus move to another position or condition. The apparatus includes a valve closer which accordingly moves to shutoff position.

Figure 1:
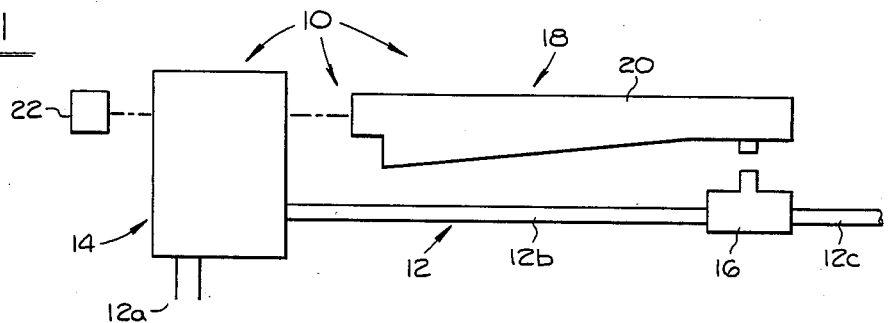
FIG. 1 is a diagrammatic view of the electromechanical safety shutoff apparatus of the present invention.

Referring to the drawings in detail, FIG. 1 shows in diagrammatic form, the apparatus of the invention indicated in its entirety at 10, incorporated in a fuel line 12 which includes segments 12a, 12b, 12c. The apparatus includes a chamber 14 and a shutoff valve 16 interposed in the fuel line. It also incorporates control means indicated in its entirety at 18, which includes a main electrical circuit portion 20 and an electrical component 22. The chamber 14 is arranged for the fuel in the fuel line to flow therethrough and the pressure of the fuel in the chamber is utilized for controlling sensing and control elements, the control functions being transmitted through the electrical circuit means 20 for controlling the shutoff valve 16.

The chamber 14 includes an inner casing 23 of transparent material, such as glass or plastic. The inner casing has an inlet passage 24 and an outlet passage 26 in which the fuel line segments 12a, 12b, are positioned, respectively, in sealing engagement therewith.

Mounted in the inner casing 23 is a baffle 28, positioned between the inlet and outlet openings 24, 26, and operable for baffling or deflecting or guiding the fuel in a certain direction to be referred to again hereinbelow, as indicated by the arrow 30.

Figure 2:
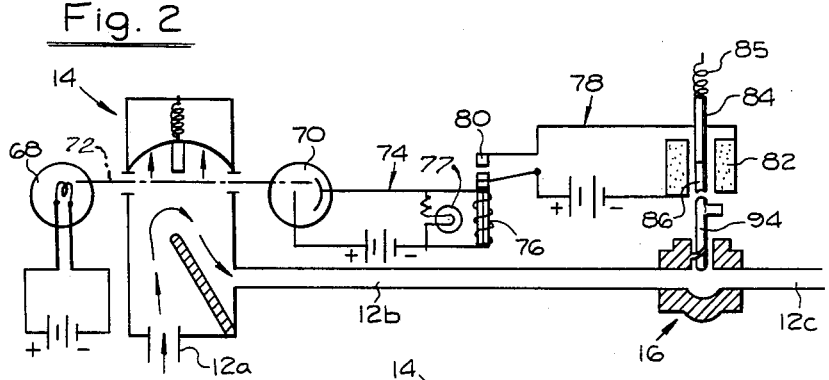
FIG. 2 is a view laid out generally similarly to FIG. 1 but showing certain components in more detail, and in valve-open condition.
Figure 3:
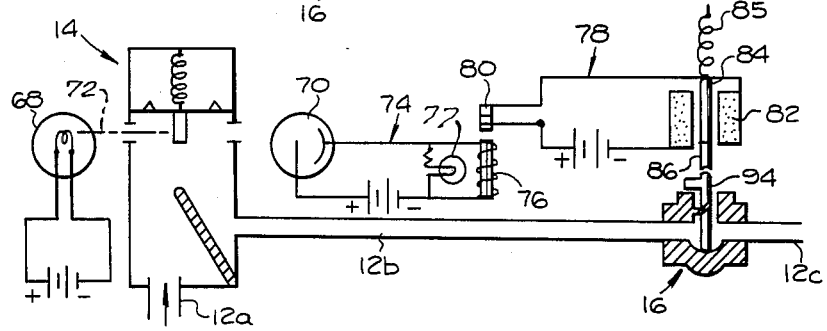
FIG. 3 is a view similar to FIG. 2 but in valve closed condition.
Figure 4:
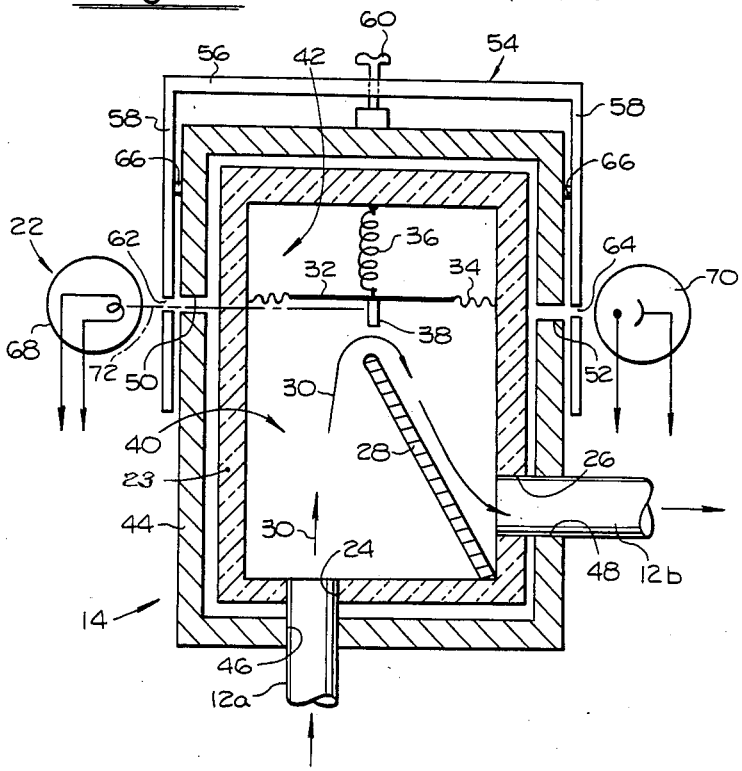
FIG. 4 is a large scale detail sectional view of the chamber used in controlling the flow of fuel, shown at the left in FIGS. 1–3.

Also mounted in the inner casing 23 is a flexible diaphragm 32, of known kind, sealed in the container against the passage of fuel therepast. The diaphragm 32 assumes a retracted or lower or normal position shown in FIGS. 3 and 4 in which it is preferably substantially perpendicular to the walls of the container. The diaphragm may have a bellows or corrugated portion 34 to accommodate its expansion and movement to an advanced position referred to hereinbelow. A compression spring 36 biases the diaphragm downwardly to its retracted position, and at low pressure of the fuel, moves it to that position. Mounted on the diaphragm 32 is an obturator or blocking element 38, which as viewed in FIGS. 2–4 is on the lower or underside of the diaphragm. The diaphragm divides the interior of the casing into a main portion 40 through which the fuel flows and another portion 42 sealed by the diaphragm against the fuel.

The baffle 28, referred to above, is positioned with its free edge adjacent the diaphragm and deflects the fuel flowing through the chamber toward and into close proximity to the diaphragm, assisting the action of the fuel in impinging on the diaphragm, and extending it, as will be referred to hereinbelow.

The chamber 14 includes an outer shell 44 of opaque material enclosing the inner casing 23. The outer shell includes an intake passage 46, and an outlet passage 48 for receiving the fuel line segments 12a, 12b. The outer shell also includes apertures 50, 52, in alignment at a position just below the diaphragm 32 as will be referred to again.

The chamber 14 also includes a fork bracket 54 of U-shape, having a top bar 56 and legs 58 depending from the top bar. This fork bracket is provided with an adjustment means 60 for adjusting its position vertically relative to the outer shell. The legs 58 are provided with apertures 62, 64, alignable with the apertures 50, 52. The fork bracket is adjustable vertically for adjusting the apertures 62, 64, relative to the other apertures 50, 52, for controlling light rays passing therethrough. Suitable guide means 66 may be provided for guiding the movements of the fork bracket.

The component 22 of the control means 18 includes an electric light 68 constituting a transmitter, cooperating with a PE cell 70, constituting a receiver, disposed on opposite sides of the chamber. Light rays are indicated by the dot-dash line 72 passing from the light bulb into the inner casing 23, and when the diaphragm is in raised position (FIG. 2), the various elements and components are positioned for the light rays to pass through the aligned apertures 62, 50, 52, 64. As noted above, the inner casing is transparent, for accommodating the light rays. This line of communication 72 is immediately below the diapragm when the latter is in its retracted or relaxed position (FIGS. 3, 4), and therefore, when the diaphragm is in that position, the blocking element 38 is operative for blocking those light rays, and shutting off operation of the electric circuit.

The PE cell 70 is in a sub-circuit 74 which for convenience will be referred to as a second sub-circuit. This sub-circuit includes a solenoid 76, and a light 77 forming a visual signal means.

Figure 5:
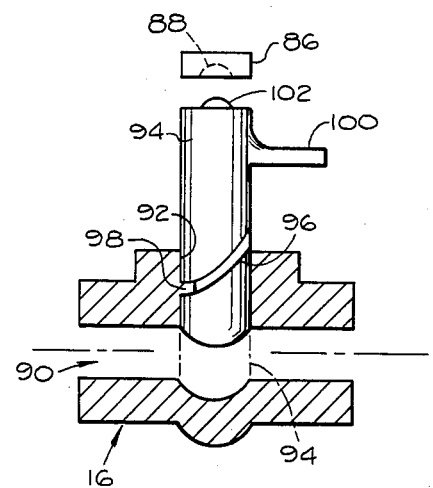
FIG. 5 is a large scale view of details of the shutoff valve and the valve closer therein.

The electrical control component 20 includes another sub-circuit 78 for convenience referred to as a first sub-circuit. This sub-circuit includes a normally closed switch 80 operably associated with solenoid 76, forming a relay therewith. When the sub-circuit 74 is de-energized, the switch 80 closes, energizing the sub-circuit 78. The sub-circuit 78 includes a solenoid 82 having an armature 84 biased to upper position by a tension spring 85. Mounted on the armature and carried thereby is a non-magnetic metal piston 86. The piston 86 has a recess 88 (FIG. 5) in its lower end to be referred to again.

The valve 16 includes a passage 90 for receiving the fuel line 12, and a top opening 92. A valve closer 94 is positioned in the opening 92 and includes a screw thread element 96, which may be in the form of a spiral groove, receiving a cooperating element 98 on the wall of the opening 92. The valve closer has a radial finger 100 for manual manipulation of the closer, and at the top is a boss 102 of rounded or spherical shape.

In the normal operation of the apparatus, the flow of fuel, such for example as a gaseous fuel, flows in the fuel line and first into the chamber 14. As the fuel does pass into the chamber, it impinges on the diaphragm and extends, or raises, or deflects it, to advanced position of FIG. 2, the baffle 28 aiding in deflecting the fuel, as referred to. A vacuum, or partical vacuum, exists in the chamber 42, enabling the gas pressure to easily raise the diaphragm. The diaphragm upon being so extended, raises the blocking element 38 out of the line of communication 72. In this situation, and in energizable condition of the control means, the light rays 72 proceed from the transmitter light bulb 22, to the receiver PE cell 70. This retains the sub-circuit 74 in energized condition, in a known manner, and the solenoid 76 is correspondingly energized and opens the switch 80, de-energizing the armature 82. The light 77 is lighted in this condition, providing a visual indication of the condition. In this condition, the tension spring 85 raises the armature, and the piston 86 to its retracted or inactive position. The valve closer 94 is then manually moved to open position, if it is not then in such position. This is done by turning the finger 100 and thus turning the closer. This turning movement acting through the spiral groove 96, and the element 98, raises the valve closer to open position.

So long as the gas flows in the gas line, and corresponding pressure is developed in the chamber 14, the diaphragm remains in raised position and the sub-circuit 78 de-energized. Accordingly, the valve remains open.

In the event that the pressure of the fuel drops below the desired value, the diaphragm 32 is forced downwardly into its retracted position (FIGS. 3, 4) by the compression spring 36, blocking the light rays 72, and de-energizing the sub-circuit 74, in turn energizing the sub-circuit 78 and energizing the solenoid 82, and consequently plunging the armature downwardly, which engages the valve closer and moves it to lower closed position. In this action, the recess 88 and the boss 102 interengage in essentially a point contact to minimize friction in the turning movement of the closer 94.

The valve closer 94 remains stable in either open or closed position, which may be provided for by friction. Upon failure of proper flow of the fuel, and closing of the valve, the valve remains closed until it is manually opened.

I claim:

1. Safety shutoff means for a fuel line comprising, a chamber in the line arranged for the flow therethrough of the fuel in the line,
   - a diaphragm in the chamber subject to the pressure of the fuel therein, and movable between a retracted position and an advanced position,
   - means biasing the diaphragm toward retracted position and operable for moving it to that position at low pressure of the fuel, the diaphragm being biased toward advanced position by the fuel and movable to that position at high pressure of the fuel,
   - signal means including a transmitter and a receiver establishing a line of communication therebetween,
   - the diaphragm including an obturator in position for and operable for interrupting said line of communication when the diaphragm is in retracted position and out of that position when the diaphragm is in advanced position,
   - valve means in said fuel line,
   - operating means for closing the valve means,
   - said signal means being operable for controlling the operating means in response to the diaphragm being in retracted and advanced positions respectively,
   - said signal means including PE cell means and the line of communication being constituted by light rays, and the obturator is operable for blocking the light rays,
   - the chamber including an inner casing of transparent material sealingly interposed in the fuel line, and
   - the signal means being exterior to said casing with the transmitter and receiver on opposite side thereof and the casing therebetween.

2. Safety shutoff means according to claim 1 wherein,
   - the chamber includes an outer shell of opaque material enclosing the inner casing therein, and
   - the outer shell includes apertures in line with said line of communication and through which the light rays pass.

3. Safety shutoff means according to claim 2 and including, a fork bracket mounted on and exterior to the outer shell and having apertures alignable with the apertures in the outer shell, and the fork bracket being adjustable for adjustably aligning the apertures therein with the apertures in the outer shell.

4. Safety shutoff means for a fuel line comprising, a chamber in the line arranged for the flow therethrough of the fuel in the line,
   - a diaphragm in the chamber subject to the pressure of the fuel therein, and movable between a retracted position and an advanced position,
   - means biasing the diaphragm toward retracted position and operable for moving it to that position at low pressure of the fuel, the diaphragm being biased toward advanced position by the fuel and movable to that position at high pressure of the fuel,
   - signal means including a transmitter and a receiver establishing a line of communication therebetween,
   - the diaphragm including an obturator in position for and operable for interrupting said line of communication when the diaphragm is in retracted position and out of that position when the diaphragm is in advanced position,
   - valve means in said fuel line,
   - operating means for closing the valve means, said signal means being operable for controlling the operating means in response to the diaphragm being in retracted and advanced positions respectively, the chamber having inlet and outlet passages communicating with the fuel line, and the chamber including a baffle therein between the passages operable for deflecting the fuel passing through the chamber into close proximity to the diaphragm.

5. Safety shutoff means for a fuel line comprising a chamber in the line arranged for the flow therethrough of the fuel in the line, a diaphragm in the chamber subject to the pressure of the fuel therein, and movable between a retracted position and an advanced position, means biasing the diaphragm toward retracted position and operable for moving it to that position at low pressure of the fuel, and diaphragm being biased toward advanced position by the fuel and movable to that position at high pressure of the fuel, signal means including a transmitter and a receiver establishing a line of communication therebetween, the diaphragm including an obturator in position for and operable for interrupting said line of communication when the diaphragm is in retracted position and out of that position when the diaphragm is in advanced position, valve means in said fuel line, operating means for closing the valve means, said signal means being operable for controlling the operating means in response to the diaphragm being in retracted and advanced positions respectively, the valve means including a closer in the fuel line, and the closer has a stable open position and a stable closed position, the control means having a normal inactive condition enabling the closer to remain in open position, and the signal means being operable, in response to the diaphragm moving to retracted position pursuant to low pressure of the fuel, for energizing the control means to active condition and the control means thereby moving the closer to closed position.

6. Safety control means according to claim 5 wherein, the control means includes a solenoid having an armature, means biasing the armature to inactive position and operable to move it to that position upon de-energization of the solenoid, the armature being operable, in response to energization of the solenoid, to move against the valve closer and move it to closed position, the control means including an electrical circuit operable in response to energization thereof to hold the solenoid in de-energized condition, and the signal means being operable in response to interrupting of said line of communication for effecting energization of the solenoid and thereby closing the valve closer.

7. Safety shutoff means according to claim 6 wherein, the control means including electrical circuit means, the circuit means including a first sub-circuit including the solenoid and a switch, and a second sub-circuit including a second solenoid and an operative component of the signal means, the signal means being energized in response to the diaphragm being in advanced position and when energized being operable to open the switch in the first sub-circuit and de-energize the first sub-circuit and enable the armature to be held in retracted position, and thereby enable the valve closer in open position.

8. Safety shutoff means according to claim 7 and including, visual signal means in said second sub-circuit.

9. Safety shutoff means according to claim 5 wherein, the valve closer has screw thread interengagement with the fuel line and such interengagement being operable to normally hold the valve in either open or closed position.

10. Safety shutoff means according to claim 9 wherein, said valve closer is movable to closed position in response to movement thereof in longitudinal direction by said armature.

11. Safety shutoff means according to claim 9 wherein, said valve closer is movable to open position in response to manual rotation thereof.

* * * * *